United States Patent
Mandal

(10) Patent No.: US 9,714,566 B2
(45) Date of Patent: Jul. 25, 2017

(54) DETERMINING LOCATIONS OF ACOUSTIC SOURCES AROUND A BOREHOLE

(71) Applicant: HALLIBURTON ENERGY SERVICES, INC., Houston, TX (US)

(72) Inventor: Batakrishna Mandal, Missouri City, TX (US)

(73) Assignee: Halliburton Energy Services, Inc., Houston, TX (US)

(*) Notice: Subject to any disclaimer, the term of this patent is extended or adjusted under 35 U.S.C. 154(b) by 259 days.

(21) Appl. No.: 14/647,811

(22) PCT Filed: Jul. 18, 2014

(86) PCT No.: PCT/US2014/047166
§ 371 (c)(1),
(2) Date: May 27, 2015

(87) PCT Pub. No.: WO2016/010553
PCT Pub. Date: Jan. 21, 2016

(65) Prior Publication Data
US 2016/0258281 A1 Sep. 8, 2016

(51) Int. Cl.
*G01V 1/40* (2006.01)
*E21B 47/10* (2012.01)
(Continued)

(52) U.S. Cl.
CPC ........ *E21B 47/101* (2013.01); *E21B 47/0005* (2013.01); *E21B 47/09* (2013.01); *G01V 1/40* (2013.01)

(58) Field of Classification Search
CPC .... E21B 47/09; E21B 47/101; E21B 47/0005; G01V 1/40
(Continued)

(56) References Cited

U.S. PATENT DOCUMENTS 4,543,817 A 10/1985 Sugiyama
4,858,462 A 8/1989 Coulter et al.
(Continued)

FOREIGN PATENT DOCUMENTS

WO 2010020796 A1 2/2010

OTHER PUBLICATIONS

PetroWiki; Acoustic logging; http://petrowiki.spe.org/Acoustic_logging ; pp. 1-12; modified on Sep. 18, 2013 and retrieved on Oct. 16, 2013.
(Continued)

*Primary Examiner* — Daniel L Murphy
(74) *Attorney, Agent, or Firm* — Polsinelli PC

(57) ABSTRACT

Systems, methods, and computer-readable storage devices for determining a location of an acoustic source outside of a borehole. The method relates to indicating a radial distance to the borehole, an offset along the borehole, and an azimuthal position around the borehole, of the acoustic source. The method includes receiving acoustic signals from respective acoustic sensors spaced along a tool lowered within the borehole. Using the acoustic signals and a borehole model, stacked energies are calculated for different radial distances from the borehole. At least one of the stacked energies is translated to an indication of a radial distance of the acoustic source from the borehole. The stacked energy for a radial distance is computed by offsetting the acoustic data signals in time in accordance the borehole model, summing the offset acoustic data signals to produce a stacked signal, and evaluating energy of the stacked signal over a time window.

20 Claims, 13 Drawing Sheets

(51) Int. Cl.
*E21B 47/09* (2012.01)
*E21B 47/00* (2012.01)

(58) Field of Classification Search
USPC .................................................. 367/35, 25
See application file for complete search history.

(56) References Cited

U.S. PATENT DOCUMENTS

| | | |
|---|---|---|
| 5,031,467 A | 7/1991 | Rambow |
| 5,216,638 A | 6/1993 | Wright |
| 5,387,767 A | 2/1995 | Aron et al. |
| 5,416,724 A | 5/1995 | Savic |
| 6,026,913 A | 2/2000 | Mandal et al. |
| 6,513,591 B1 | 2/2003 | Heijnen |
| 7,219,762 B2 | 5/2007 | James et al. |
| 7,464,588 B2 | 12/2008 | Steinsiek |
| 7,819,188 B2 | 10/2010 | Auzerais et al. |
| 8,201,625 B2 | 6/2012 | Almaguer |
| 8,245,780 B2 | 8/2012 | Fidan et al. |
| 8,417,457 B2 | 4/2013 | Franquet |
| 8,476,583 B2 | 7/2013 | Legrand et al. |
| 8,517,094 B2 | 8/2013 | Sweatman et al. |
| 8,539,820 B2 | 9/2013 | Al-Qahtani et al. |
| 2011/0030467 A1 | 2/2011 | Bakulin |
| 2011/0188346 A1 | 8/2011 | Hull |
| 2012/0092960 A1 | 4/2012 | Gaston et al. |
| 2012/0285221 A1 | 11/2012 | Al-Qahtani et al. |
| 2013/0100768 A1 | 4/2013 | Lopez et al. |
| 2013/0265851 A1 | 10/2013 | Faber et al. |
| 2014/0123759 A1 | 5/2014 | Minto et al. |

OTHER PUBLICATIONS

Haldorsen, Jakob; "Borehole Acoustic Waves", Borehole acoustic waves may be as simple or as complex as the formations in which they propagate. An understanding of wave-propagation basics is essential for appreciation of modern sonic-logging technology; Spring 2006.

Timur, A.; "1987 Acoustic Logging"; In petroleum Engineering Handbook, ed Howard B. Chap. 51, Richardson, Texas: Society of Petroleum Engineers; http://www.onepetro.org/mslib/app/Preview.do?paperNumber=SPE-1987-51-PEH&socie ; retrieved Oct. 16, 2013.

SPE 149602; Distributed Acoustic Sensing—a new way of listening to your well/reservoir; Copyright 2012, Society of Petroleum Engineers.

International Search Report and Written Opinion mailed Apr. 17, 2015; in PCT patent application No. PCT/US2014/047166.

DETERMINING LOCATIONS OF ACOUSTIC SOURCES AROUND A BOREHOLE

CROSS-REFERENCE TO RELATED APPLICATIONS

This application is a national stage entry of PCT/US2014/047166 filed Jul. 18, 2014, said application is expressly incorporated herein in its entirety.

TECHNICAL FIELD

The present disclosure relates to the field of acoustic investigation techniques for determining locations of acoustic sources around a borehole of a subterranean well, including behind a well casing.

BACKGROUND

Oil and gas operations involve accessing underground hydrocarbon reservoirs contained within subterranean formations. As part of ordinary operations, drilling is conducted to form a borehole in order to access desired sites. Once a borehole is formed, ordinarily a casing is provided within at least a portion of the borehole in order to define and stabilize the borehole for subsequent drilling or hydrocarbon retrieval. The borehole casing is commonly formed by steel piping set in place with the introduction of cement between the borehole wall and the piping. Maintaining the integrity of the casing and borehole is desirable during drilling and well completion, and the casing and borehole must withstand attack by borehole fluids as well as the high temperatures and pressures that are present downhole. The casing affords protection against various borehole fluids or other contaminates from entering the borehole or moving to unwanted zones. For example, proper protection by the casing can prevent accumulation of fluids in undesirable locations or zones, or flow of fluids from one zone to another, or to the surface. Other dangers include movement of fluids to contaminate the water table or creation of hazardous conditions such as explosive mixtures.

Accordingly, the integrity of the casing and borehole can be monitored during operations to prevent the occurrence of adverse conditions, including the presence of leaks, or the movement of fluids. Detection and discovery of the presence of leaks in the casing and borehole has been the focus of inquiry. A number of techniques are known for determining whether a well or a borehole has proper integrity and no leaks.

BRIEF DESCRIPTION OF THE DRAWINGS

Embodiments of the present disclosure will now be described by way of example with reference to the attached figures, wherein.

The present

DETAILED DESCRIPTION

Figure 1:
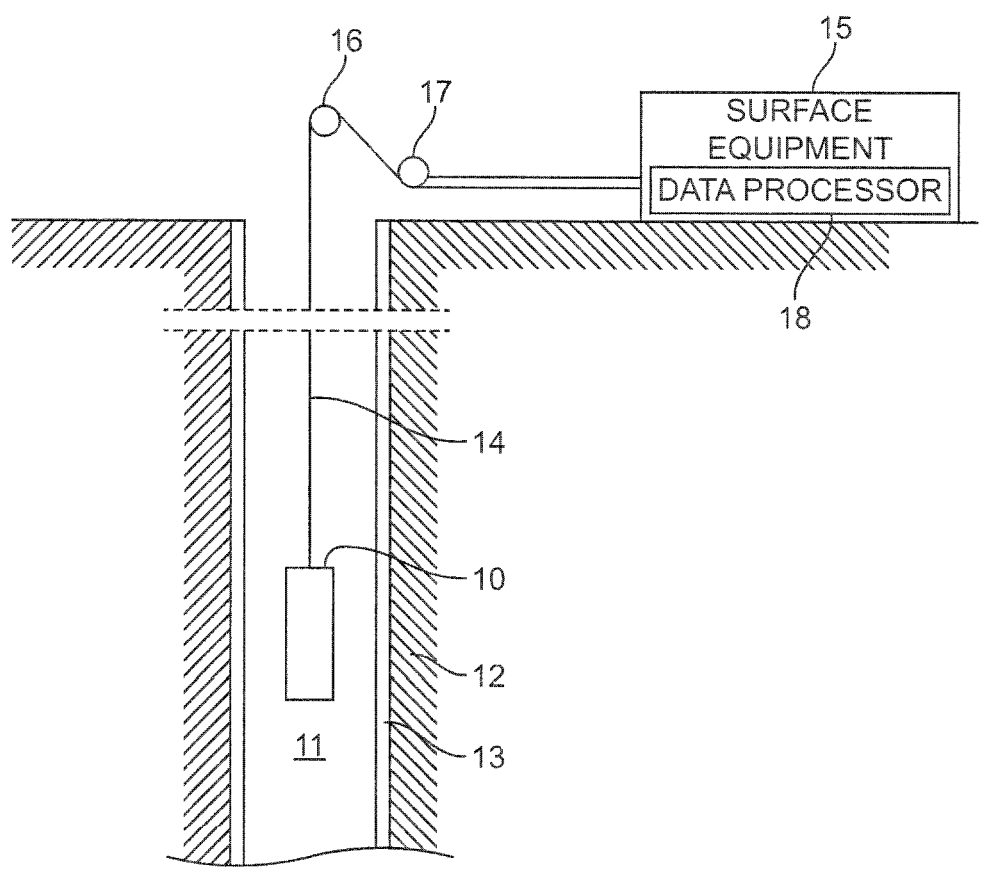
FIG. 1 is an elevational view of an example system for determining a location of an acoustic source outside of a borehole, according to aspects of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the following description, terms such as "upper," "upward," "lower," "downward," "above," "below," "downhole," "uphole," "longitudinal," "lateral," and the like, as used herein, shall mean in relation to the bottom or furthest extent of, the surrounding wellbore even though the wellbore or portions of it may be deviated or horizontal. Correspondingly, the transverse, axial, lateral, longitudinal, radial, and the like orientations shall mean positions relative to the orientation of the wellbore or tool.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "communicatively coupled" is defined as connected, either directly or indirectly through intervening components, and the connections are not necessarily limited to physical connections, but are connections that accommodate the transfer of data between the so-described components. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other thing that "substantially" modifies, such that the component need not be exact. For example, substantially cylindrical means that the object resembles a cylinder, but can have one or more deviations from a true cylinder.

The term "radial" and/or "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object and can be described as "longitudinally."

The present disclosure describes methods and apparatus for accurately identifying and locating acoustic sources within and around a borehole such that a radial distance associated with an acoustic source, such as a fluid leak, from a center axis of the borehole can be more accurately identified. Fluid leaks such as water leaks, oil leaks or other flow of fluid caused by cracks in the earth or other issues can cause damage to the borehole and reduce its effectiveness. Leaks or other damage to the borehole or casing can cause unwanted or hazardous accumulation or flow to other zones. Therefore, the detection of such leaks in and around the borehole can result in increased efficiency and provide for enhanced safety in construction of the well.

A fluid leak naturally produces sound such as acoustic noise, and accordingly is an acoustic source. The movement of earth, fluid or any material in and around the borehole can be an event which produces sound, and thus can serve as an acoustic source. Accordingly, although fluid leaks and the like may serve as an acoustic source, acoustic sources are not limited to these but can be anything which produces sound such as acoustic noise. An acoustic source may comprise a source of pressure waves detectable within and around the borehole, including but not limited to fluid leaks or the movement of earth or other material within a casing, within or around the cement disposed in the borehole, as well as the area surrounding the borehole.

Accordingly, the present disclosure provides a method, system, and a computer-readable storage device storing instructions for determining a location of an acoustic source such as a fluid leak to determine what is occurring within and around a borehole, including what is occurring behind a casing where applicable. As used herein, behind a casing refers to an acoustical source that is located on the same side of the casing as the formation and the tool can be on the other side.

Acoustic tools can be employed in the form of an array of acoustic sensors for receiving acoustic signals from an acoustic source, and can include an azimuthal sensor array or a vertical sensor array. Some acoustic tools may include transmitters for additional logging operations, but the determination and characterization of a downhole acoustic source may be accomplished without transmitting an acoustic signal from the tool.

The present disclosure can be used with existing hardware or custom hardware. For example, standard acoustic tools such as a borehole compensated sonic array tool (B-SAT) can be utilized individually or in connection with other tools such as a Full Wave Sonic (FWS) system or a WaveSonic tool for implementing the concept disclosed herein. The concepts disclosed herein can be implemented using existing hardware with a change in the firmware or software programming such that the signal reception and processing is altered. In one example, the reprogramming would eliminate the transmission of an acoustic signal in the B-SAT tool. The acoustic transmitter of the B-SAT tool would be turned off, and the B-SAT tool would be used as a "listening" array. Acoustic data signals from the acoustic sensors in the B-SAT tool would be processed as described herein.

FIG. 1 illustrates a general system for determining the locations of acoustic sources in or around a borehole. For example, such an acoustic source is a fluid leak of flowing gas or liquid in or around the borehole, including through the casing, behind the casing, or through the formation around the borehole. To the extent such a fluid leak produces an acoustic signal, the fluid leak may serve as an acoustic source. A tool 10 is located within the borehole 11 which is penetrating down in the earth 12. Accordingly, the tool acquires an acoustic signal from a fluid leak or other acoustic source in the form of acoustical data for processing. A leak within the casing 13 or cement layer behind the casing may function as an acoustic source, generating an acoustic signal, such as sound waves, detectable by the tool. Additionally, a leak in the formation surrounding the borehole may also function as an acoustic source. Acoustic sensors coupled to the tool sense the acoustic signal from the acoustic source and provide respective acoustic data signals for processing according to the present disclosure to determine the location of the acoustic source.

In the example of FIG. 1, the borehole 11 is lined by a casing 13. Although a casing 13 is present in this example, in other embodiments, a casing may not be present. The tool is lowered into the borehole 11 by a conveyance 14 and can be raised through the use of equipment 15 over a wheel 16 while the acoustic data signals are recorded or processed. The conveyance may comprise wireline, slickline, coiled tubing, or another downhole conveyance. The depth of the tool 10 can be determined through a depth gauge 17. A data processor 18 may be communicably coupled to the tool, positioned at the surface or within the tool itself. In the embodiment shown, the data processor 18 may be communicably coupled to the tool through the conveyance 14, and acoustic data signals from acoustic sensors may be transmitted to the data processor 18 through the conveyance 14. The data processor 18 processes the acoustic data signals to provide information about acoustic source in order to influence the choice of well operations or, in the case of a leak, to aid in repairs. The tool 10 is moved over time up or down in the borehole. As the acoustic sensors on the tool receive acoustic signals from the acoustic source, the system also records some data about the depth of the tool in order to determine the depth of the acoustic source.

Figure 2:
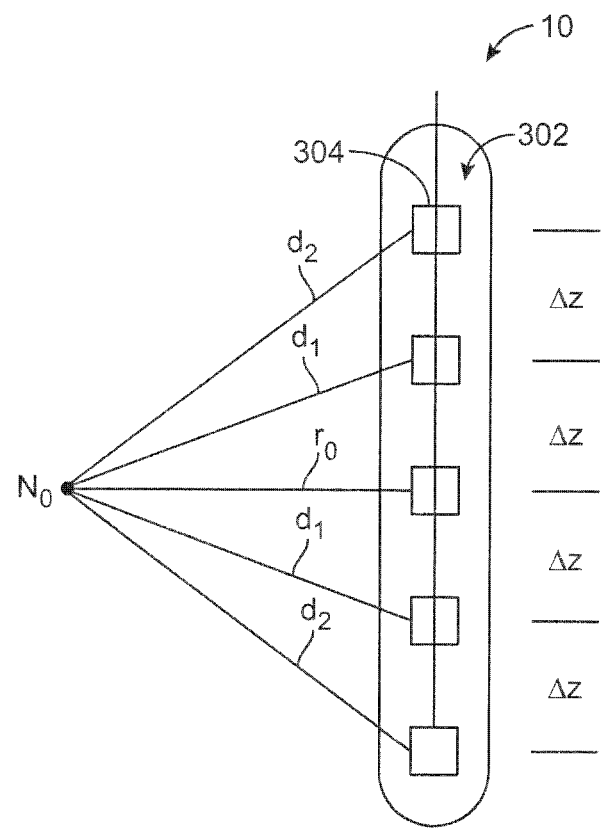
FIG. 2 is an example schematic diagram of a downhole tool having acoustic sensors spaced along the tool for receiving acoustic signals from an acoustic source.

FIG. 2 shows an example of acoustic sensors 304, which are spaced along the tool 10. In this example, the sensors 304 are disposed in a linear array 302 centered along the longitudinal axis of the tool 10, and neighboring sensors are spaced by a constant displacement ($\Delta z$) along the tool. Acoustic data signals are received from the respective acoustic sensors 304 as the tool 10 is lowered or raised within the borehole. The data signals received by the acoustic sensors 304 when the tool 10 is at or around a particular depth are processed to obtain a measure of whether there is a noise source $N_0$ at this particular depth or displacement along the borehole and at a particular radius ($r_0$) from the borehole at this depth. The particular depth or displacement is the depth or displacement of the center of the sensor array 302 along the borehole.

In one method of acoustic data collection, the tool is lowered or raised incrementally, so that once the tool has been moved to a new displacement, the acoustic data signals received at this displacement from the respective acoustic sensors 304 are recorded and processed, in order to determine the radii from the borehole of any acoustic noise sources at this displacement along the borehole. In another method of data collection, the tool is slowly lowered or raised continuously at a constant rate, and the acoustic data signals received over respective increments of displacement from the respective acoustic sensors 304 are recorded and processed, in order to determine the radii from the borehole of any acoustic sources within each increment of the displacement. In either case, a borehole model of acoustic delay is used for stacking of the acoustic data signals to determine a measure of whether there is a noise source at a particular radius ($r_0$) from the borehole at or around a particular displacement along the borehole.

The borehole model specifies acoustic delay to a respective acoustic sensor as a function of the radial distance from the borehole and an offset in displacement along the borehole to the respective acoustic sensor. The acoustic data signals are offset in time in accordance with the borehole model, the offset acoustic data signals are summed to produce a stacked signal, and energy of the stacked signal is evaluated over a time window to determine the measure of whether there is a noise source at the radius ($r_0$) from the borehole at or around the particular displacement along the borehole.

The borehole model of acoustic delay can be based on empirical data. For example, the acoustic delay from an acoustic source to each acoustic sensor in the tool can be obtained when the tool is lowered into a test borehole and a neighboring borehole has been drilled and the acoustic source has been placed in the neighboring borehole. For example, the acoustic source in the neighboring borehole is an orifice or whistle though which high pressure fluid is released to simulate a fluid leak. The differences in the acoustic delay from the acoustic source to each of the acoustic sensors in the tool are obtained from maxima in cross-correlations between the acoustic data signals from the respective acoustic sensors.

The borehole model of acoustic delay can also be based on the geometry of borehole, the acoustic properties of the materials around the borehole, and the propagation of sound through the materials. The acoustic properties include the elasticity and densities of the materials, which determine the velocity of sound and acoustic impedance of the materials. One way of considering the propagation of sound through the materials is a method of ray tracing in which the path from the acoustic source to each acoustic sensor is found by applying Snell's law, and then the delay along the path of the ray is computed as the sum of the delays through the materials along the path. The delay through each material is computed as the distance of travel along the path through the material divided by the velocity of sound in the material.

The borehole model can model the structure of the casing (13 in FIG. 1). The fact that the sound travels through the casing can be accommodated and used for identifying the originating acoustic source. The particular characteristics of the casing and borehole can affect the parameters used. For example, parameters such as the size of the borehole, casing width, cement, diameters, casing material, depths, and so forth can be used to model the parameters for determining the acoustic delay from an acoustic source around the borehole to the acoustic sensors in the tool. The sound or the acoustic wave can travel through different media in different ways. Thus, the acoustic wave can have certain characteristics as it travels through earth 12 (and different kinds of earth such as rock, sand, clay, etc.) and as it travels through the casing material 13. The material and characteristics of the structure of the borehole that include casing, tubing and the like can be known or modeled. The acoustic response to sound traveling through the borehole structure can be known or modeled. Thus, the borehole model incorporates this knowledge so that the location of an acoustic source outside of the borehole can be precisely determined.

Regardless of the precision or complexity of the borehole model, the acoustic delay as a function of radius ($r_0$) and displacement (z) has a certain characteristic shape for an acoustic source outside of the casing. In this case, the acoustic delay is primarily a function of the distance (d) from the acoustic source to the respective acoustic sensor. This distance is given by the Pythagorean theorem as $d=(r_0^2+z^2)^{1/2}$. Assuming that the velocity (V) over this distance is a constant, the acoustic delay (T) is given by $T=(r_0^2+z^2)^{1/2}/V$.

Figure 3:
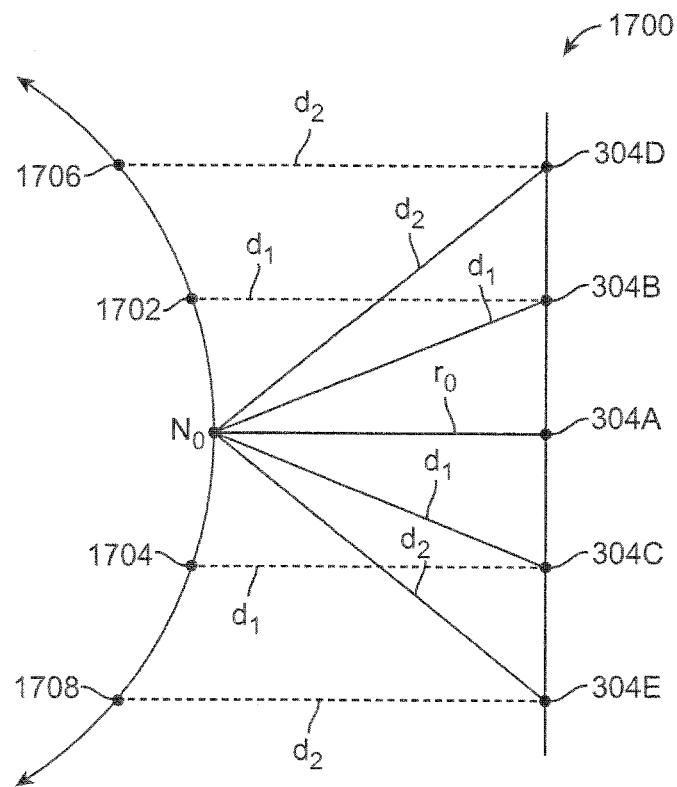
FIG. 3 is an example schematic diagram of a borehole model specifying acoustic delay to a respective acoustic sensor of the tool of FIG. 2 as a function of radial distance from the borehole and an offset in displacement along the borehole to the respective acoustic sensor.

FIG. 3 illustrates the characteristic shape of the borehole model for the case of $T=(r_0^2+z^2)^{1/2}/V$. Assume point $N_0$ shown in FIG. 3 as the point source. Respective distances from $N_0$ are shown as $r_0$, $d_1$ and $d_2$ to each respective acoustic sensor 304A, 304B, 304C, 304D and 304E. However, from the viewpoint of each of these sensors, the acoustical source $N_0$ is equivalent to an acoustic source spaced horizontally from the sensor. This horizontal spacing is proportional to the acoustic delay from the point $N_0$ to the respective acoustic sensor. Therefore, $N_0$ could be viewed at position 1702 by the sensor 304B (at a distance of $d_1$), at position 1704 for sensor 304C (at a distance $d_1$), at position 1704 for sensor 304D (at a distance$_{12}$) and at position 1708 for sensor 304E (at a distance $d_2$). As can be seen, these positions begin to form a parabola.

In general, in the range of $z^2 \ll r_0^2$, the borehole model has a parabolic shape. The parabolic portion of the borehole model can be derived by expanding $(r_0^2+z^2)^{1/2}$ as a binomial series $(r_0^2)_{1/2}+\frac{1}{2}(r_0^2)^{(1/2-1)}z^2+\ldots \approx r_0+z^2/2r_0$. Then the time difference of the acoustic signal between the sensors 304B or 304C and the middle sensor 304A would be $\Delta z^2/2r_0V$, and the time difference of the acoustic signal between the sensors 304D or 304E and the middle sensor and would be $2\Delta z^2/r_0V$.

In practice, the borehole model of acoustic delay can be a table of acoustic delay values for combinations of certain radial distances ($r_0$) and the acoustic sensor offsets ($n\Delta z$) along the tool. The borehole model could also be a table of parameters for fitting the acoustic delay to a parabolic curve, such as a table of velocities ($V_i$) for certain radial distances. For example, for a given radius ($r_0^2$), a corresponding value of velocity (V) would be found by table lookup and interpolation, and then the velocity ($V_i$) would be used in the parabolic equation $T=(n\Delta z)^2/r_0 V_i$ for the corresponding time difference to the respective acoustic sensor displaced along the tool by ($n\Delta z$) from the middle acoustic sensor.

Figure 4:
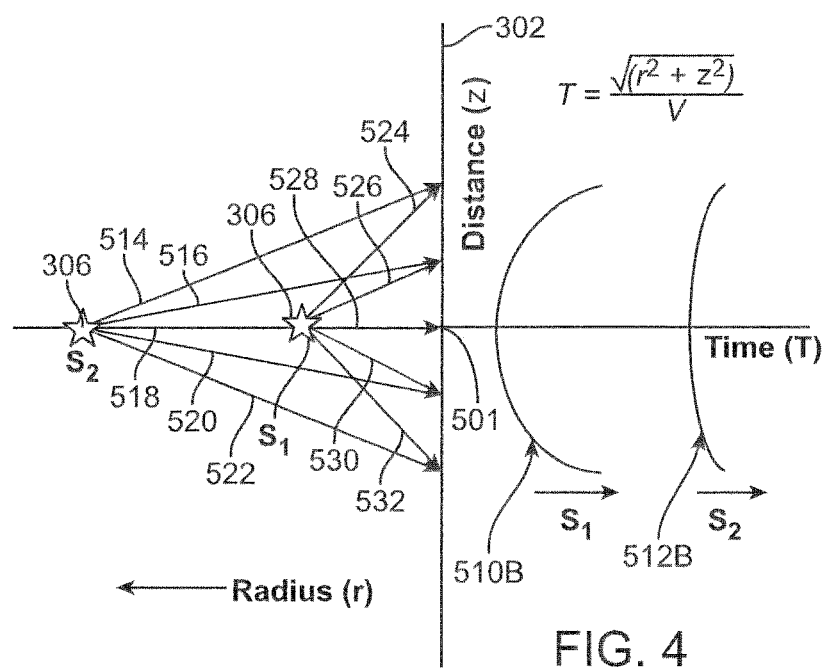
FIG. 4 is an example schematic diagram illustrating different acoustic delays for different radial distances from the borehole in accordance with the borehole model of FIG. 3.

FIG. 4 illustrates an example where there are two different acoustic sources S1 and S2. The tool 302 is shown simply as a vertical line with a distance (z) above or below a central/reference point 501. Distances from acoustic source $S_2$ to the respective acoustic sensor on tool 302 are shown as having different respective distances 514, 516, 518, 520, 522. As can be understood, the relative differences between each of these distances are smaller than would be the case of $S_1$. $S_1$ has a smaller radius from the central axis represented by a tool 302. $S_1$ has associated distances 524, 526, 528, 530 and 532. This represents a distance from the source $S_1$ to each of the acoustic sensors 304 in the array 302. As is shown in FIG. 4, the time T that an acoustic signal takes from a respective source $S_1$ or source $S_2$ to a respective acoustic sensor equals the square root of $(r^2+d^2)$ divided by "V". "V" is the acoustic velocity through the medium 12, "r" is the radial distance, and "d" is the vertical distance between the respective source $S_1$ or source $S_2$ to a respective acoustic sensor. Thus, as the tool 302 moves up or down in the borehole, the time it takes for acoustic signal to travel from one of the sources $S_1$ or $S_2$ will vary. As an example, at a given time, acoustic signal will be received from path 528 before it is received from path 524. Similarly, at the given time, the acoustic signal along path 518 will be received by the respective acoustic sensor before the acoustic signal received at the respective acoustic sensor associated with path 514. These different timings provide valuable data which, when processed, provides more information not only about the depth of the acoustic sources $S_1$ and $S_2$, but also information about the radius or distance of each acoustic source from the tool. There will be a time signature associated with the acoustic data which can include the amount of acoustic energy of the respective signal.

As further shown in FIG. 4, a different acoustic wave representation for $S_1$ 5106 and $S_2$ 512B can be shown which compares the relative differences in time between the first signal reaching an acoustic sensor from the acoustic source (such as signal 528 and 518 for $S_1$ and $S_2$, respectively) and the last signal to reach a different acoustic sensor in the tool 302 (such as signal 524 and 514 for $S_1$ and $S_2$, respectively). The parabolic curve 5106 signifies the arrival time along the axis of the tool 302 from an acoustic source at $S_1$. The arrival time for signal 528 from $S_1$ is represented at the left of the parabolic curve 5106 as the first time data received at the array. As one moves up and down the tool 302, the time it takes for the respective signals 526, 524, 530, 532 from $S_1$ to be detected by a respective acoustic sensor is illustrated in the parabolic curve 510B. Similarly, the signal 518 represents the first signal received at the tool 302 from source $S_2$. As one moves up and down the tool 302, the time it takes for the respective signals 516, 514, 520, 522 from $S_2$ to be detected by a respective acoustic sensor is illustrated in the parabolic curve 512B. The time difference between signal 528 and 524 from $S_1$ are more pronounced in parabolic curve 510B than the time differences between signal 518 and 514 from acoustic source $S_2$ because $S_1$ is closer than $S_2$ to the axis 302 and thus the acoustic sensor array 304.

Figure 5:
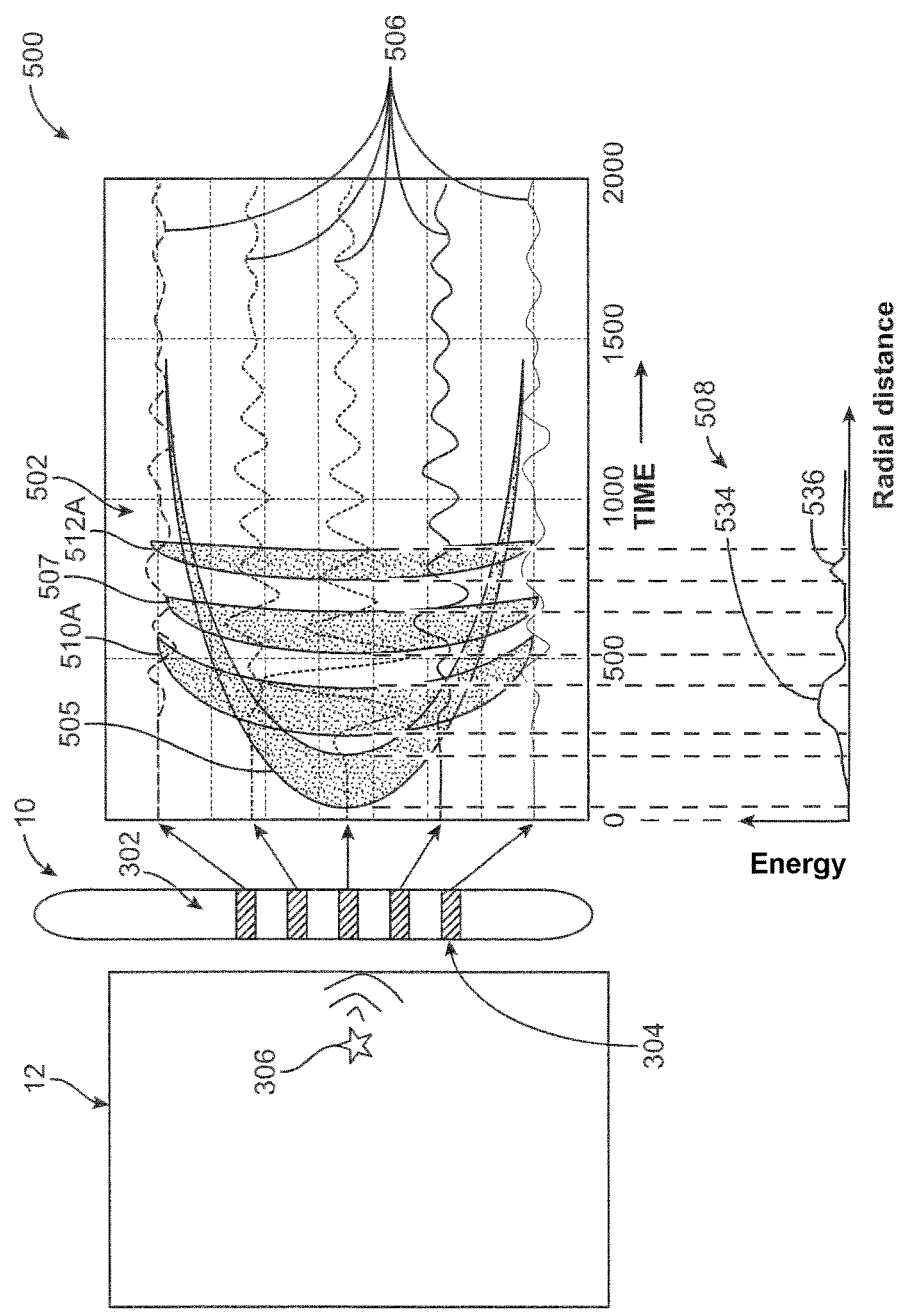
FIG. 5 is an example schematic diagram of timing concepts associated with offsetting and summing acoustic data signals from the acoustic sensors of the tool in FIG. 2.

FIG. 5 illustrates the use of the borehole model of acoustic delay for the signal processing. As is shown in FIG. 5, the earth 12 can include a leak at a particular location or an event or structure that is an acoustic source 306. Each of the acoustic sensors 304 in the sensor array 302 provides a respective acoustic data signal 506, which is then processed as shown in the graphs 500. The respective acoustic data signals 506 are shown in graph 502 as a function of time on the horizontal axis. Also overlaid on the acoustic data signals 506 are parabolic envelope templates 505, 507, 510A, 512A for different radii from the sensor array 302. Each parabolic envelope template can be used for the "stacking" operation, which offsets each of the respective acoustic data signals in accordance with an acoustic delay from the borehole model as a function of the radial distance from the borehole and the offset in displacement along the borehole to the acoustic sensor, and sums the offset acoustic data signals to produce a stacked signal, and evaluates energy of the stacked signal over a time window corresponding to the horizontal width of the parabolic envelop template in the graph 502. For example, the parabolic envelope template 505 is used to process the acoustic data signals for determining a position of an acoustic source 306 that is very close to the sensor array 302. See, for example, the similarities between parabolic curve 510A and curve 510B (in FIG. 4) representing the parabolic acoustic delay of the acoustic data signals from the source S1 (in FIG. 4). Similarly, curves 510A, 507 and 512A would respectively be used to process acoustic data signals from acoustic sources 306 farther away from the sensor array 302. Note that parabolic curve 512A is more similar to the curve 512B (in FIG. 4) which represents the parabolic acoustic delay of the acoustic data signals from the source S2 (in FIG. 4).

The time window can be chosen depending on the frequency of the acoustic sources to be analyzed. For example, a wider window is used for locating a low frequency source and a narrower window is used for locating a high frequency source. The different frequency filtering is used to differentiate the acoustic source characteristics. A wider time window can also be used in connection with raising or lowering the tool 302 at a slower rate for locating the acoustic sources with increased precision.

FIG. 5 also shows a graph 508 of acoustic energy verses radial distance from the borehole. The graph 508 is the result of the processing of the acoustic data signals 506. For each parabolic envelope template, the energy of the stacked signal over the time window is projected to the radial distance in the graph 508 corresponding to the radial distance of the parabolic envelope template. The graph 508 provides a translation of the stacked energies to an indication of radial distances of acoustic sources form the borehole. In this example the graph 508 has peaks 534 and 536 indicating that acoustic sources are not adjacent to the well casing or the sensor array 302, and instead the peaks 534 and 536 are projected from the parabolic envelope templates 510A and 512A, respectively, and the radial distances of the peaks 534 and 536 in the graph 508 indicate the respective radial distances of the acoustic sources $S_1$ and $S_2$ from the sensor array 302.

The data processing of FIG. 5 can be performed by surface equipment or a device that is connected to the sensor array 302 and is part of the surface equipment (15, 18 in FIG. 1). For example, such equipment or device includes a general purpose computer. In other embodiments the tool including the sensor array 302 can record the data and the data can be analyzed once the tool has been received at the surface after a logging operation. In one aspect, the tool can be used off-shore and can be deployed on a platform or in water.

Figure 6:
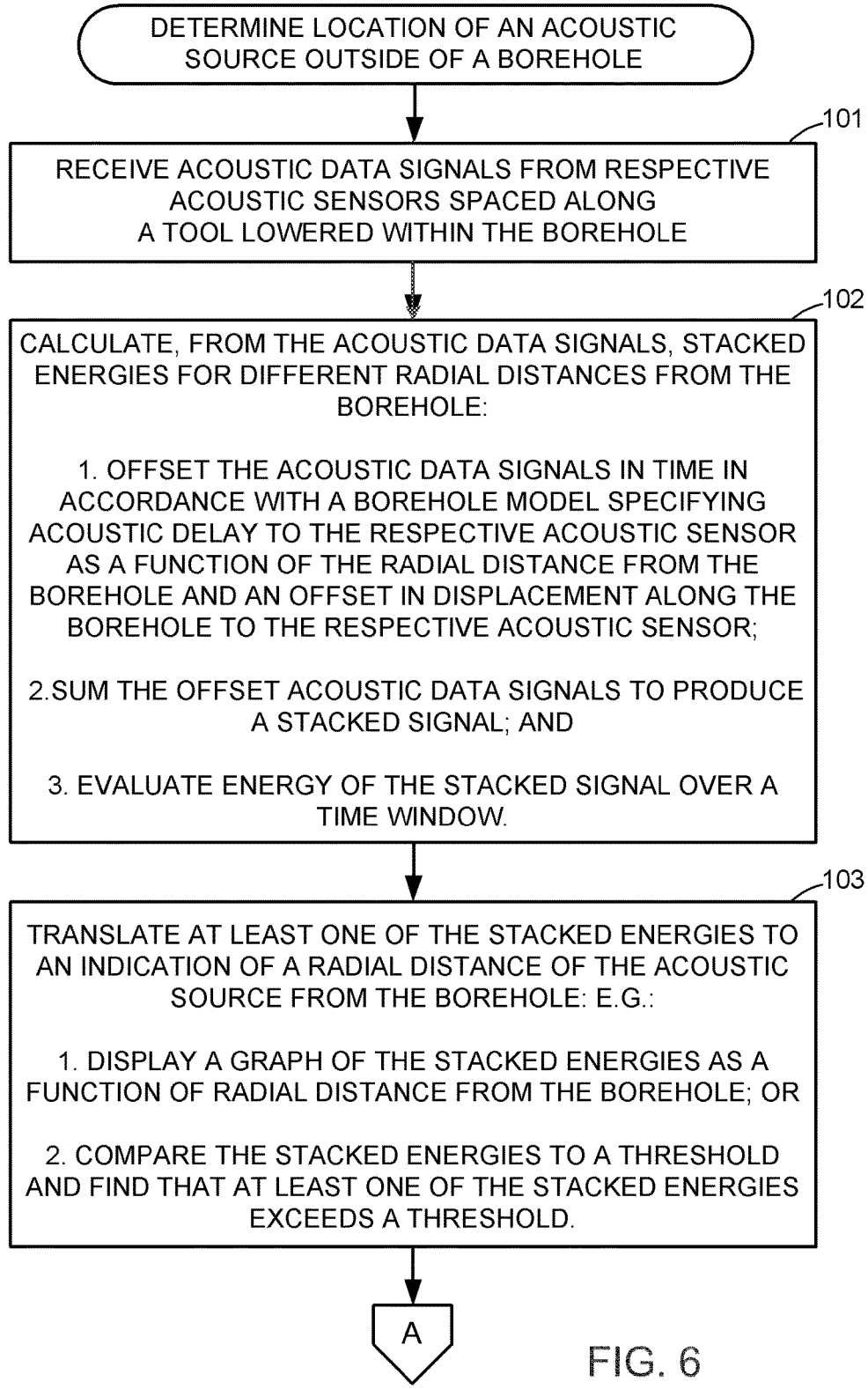
FIGS. 6 and 7 together comprise a flowchart of an example method of determining a location of an acoustic source outside of a borehole.
Figure 7:
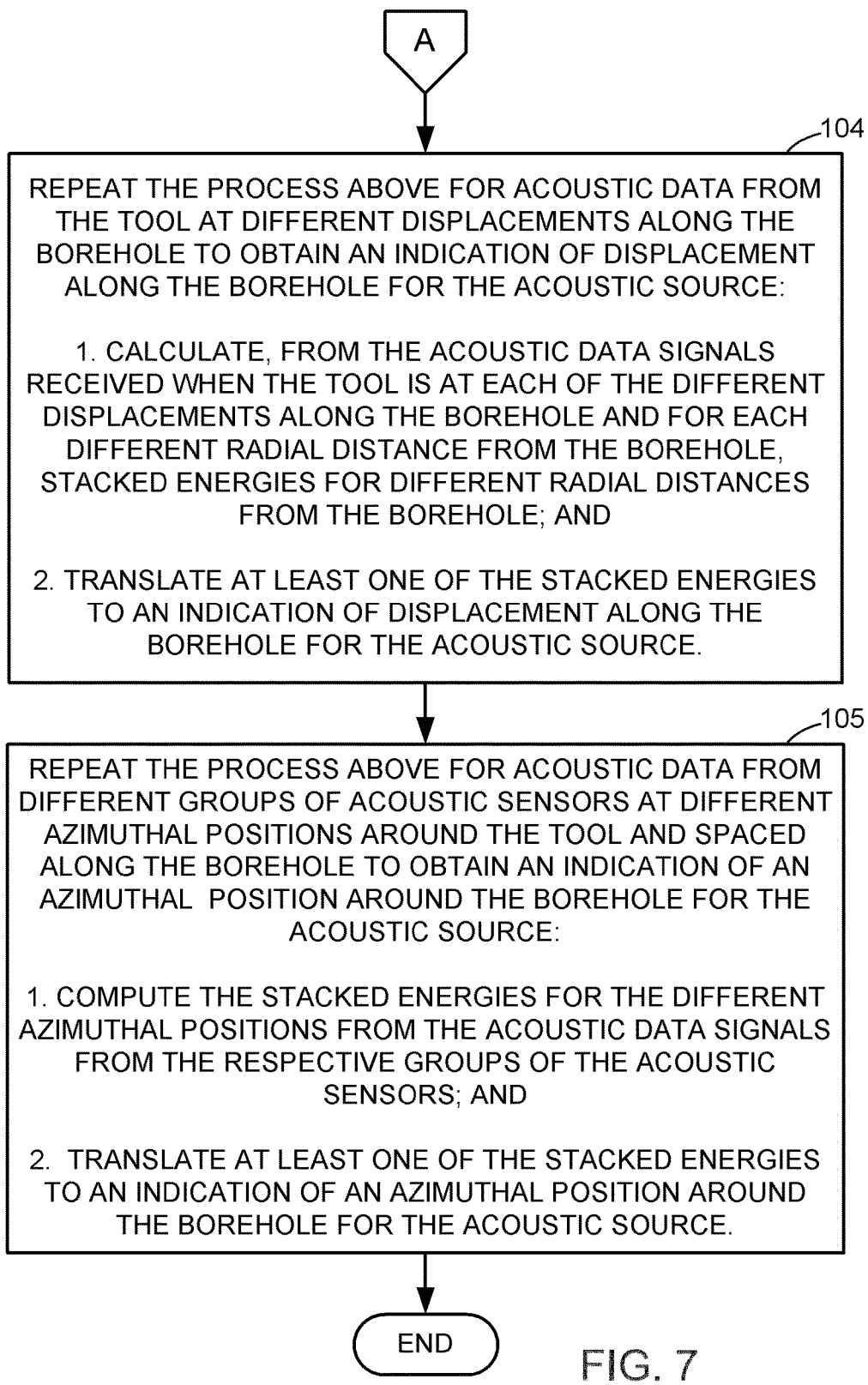

FIGS. 6 and 7 show a flowchart of data processing operations introduced in FIG. 5 for determining a location of an acoustic source outside of a borehole. In a first box 101 of FIG. 6, acoustic data signals are received from respective acoustic sensors spaced along a tool lowered within the borehole.

Next, in box 102, stacked energies for different radial distances from the borehole are calculated from the acoustic data signals. To calculate each stacked energy, the acoustic data signals are offset in time in accordance with a borehole model specifying acoustic delay to the respective acoustic sensor as a function of the radial distance from the borehole and an offset in displacement along the borehole to the respective acoustic sensor. The offset acoustic data signals are summed to produce a stacked signal, and the energy of the stacked signal is evaluated over a time window. Thus, the stacked energy is the energy of the stacked signal. In effect, the time offsets align the components of the acoustic data signals originating from any acoustic source that is at the radial distance from the borehole and at the position along the borehole of the midpoint of the acoustic sensor array, so that the summation coherently adds these components of the acoustic data signal, and incoherently adds noise and incoherently adds any acoustic signals from any acoustic sources that are not located at the radial distance from the borehole or are not at a position along the borehole of the midpoint of the acoustic sensor array. Consequently, the energy of the stacked signal over the time window is a measure of whether an acoustic source is located at the radial distance from the borehole and at the position along the borehole of the midpoint of the acoustic sensor array.

Next, in box 103, at least one of the stacked energies is translated to an indication of a radial distance of the acoustic source from the borehole. For example, a graph of the stacked energies as a function of radial distance from the borehole is displayed. Then the presence of any acoustic source is indicated by a peak in the graph, and the radial location of the acoustic source is indicated by the radial distance of the peak on the graph. In a similar fashion, the number and location of acoustic sources outside of the borehole can be automatically found by a computer program that searches for peaks in the stacked energy as a function of radial distance, for example, using a conventional gradient ascent method that compares the stacked energies of neighboring radii. The translation of the stacked energies can also compare the stacked energies to a threshold in order to find that at least one of the stacked energies exceeds the threshold. For example, the threshold is two or three times the mean noise level of the stacked energies. Therefore the comparison of the stacked energies to the threshold can remove the distraction of the noise floor from a graph of the stacked energy as a function of radial distance, and speed up the search for peaks in the stacked energy as a function of radial distance.

Execution continues from box 103 to box 104 in FIG. 7. In box 104, the process of FIG. 6 is repeated for acoustic data from the tool at different displacements along the borehole to obtain an indication of displacement along the borehole for the acoustic source. Stacked energies for different radial distances from the borehole are calculated from the acoustic data signals received when the tool is at each of the different displacements along the borehole and for each different radial distance for the borehole. At least one of the stacked energies is translated to an indication of displacement along the borehole for the acoustic source. For example, the translation includes a graph of the stacked energy as a function of radial distance from the borehole and displacement along the borehole, peaks of stacked energy in the graph indicate respective acoustic sources, and the radial distance and displacement of each peak provides the radial distance and displacement of each indicated acoustic source. The translation may involve the comparison of the stacked energies to a threshold. For example, a region of stacked energies at least two or three times the mean value of the noise floor indicates an acoustic source in this region, and the centroid of stacked energy (e.g., $x_i = \Sigma x_i E_j / \Sigma E_3$ where $x_i$ represents Cartesian coordinates) of the region provides the radial distance and displacement of the indicated acoustic source.

Next, in box 105, the process of FIG. 6 and box 104 is repeated for acoustic data from different groups of acoustic sensors at different azimuthal positions around the tool and spaced along the borehole to obtain an indication of an azimuthal position around the borehole for the acoustic source. Stacked energies are computed for the different azimuthal positions from the respective groups of the acoustic sensors, and at least one of the stacked energies are translated to an indication of an azimuthal position around the borehole for the acoustic source. The translation may include interpolation of the positions of a noise source detected from the acoustic data signals of two groups of acoustic sensors. For example, the interpolation includes a weighted average ($x_i = (x_{i1} E_1 + x_{i2} E_2)/(E_1 + E_2)$) of each pair of position coordinates ($x_{i1}$, $x_{i2}$) from the processing of acoustic data from each of two groups of acoustic sensors, and the average is weighted by the stacked energies ($E_1$, $E_2$) indicated by the processing of acoustic data from each of two groups of acoustic sensors.

Figure 8:
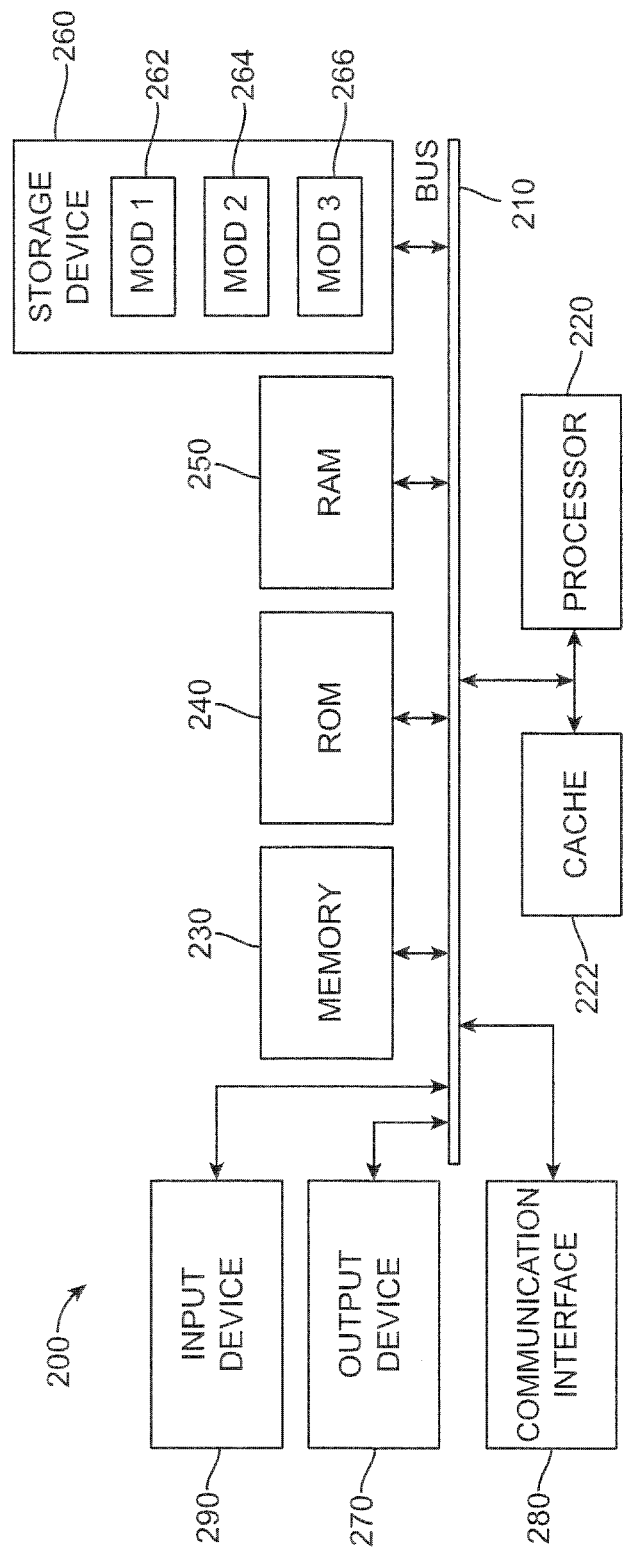
FIG. 8 is an example schematic diagram of a digital computer including a data processor for executing instructions to perform the example method of FIGS. 6 and 7.

FIG. 8 shows a basic general purpose computing system or device. The components of FIG. 8 can be applied as appropriate in connection with the data processor 18 shown in FIG. 1 as part of surface equipment 15 according to the present disclosure. In other words, the system or device shown in FIG. 1 can essentially be reprogrammed or firmware changes can be made in order to implement the features disclosed herein. The system can also be applied to a subsea or offshore embodiment with appropriate alternative components to accommodate that context of use.

With reference to FIG. 8, an exemplary system and/or computing device 200 includes a processing unit (for example, a central processing unit (CPU) or processor) 220 and a system bus 210 that couples various system components, including the system memory 230 such as read only memory (ROM) 240 and random access memory (RAM) 250, to the processor 220. The system 200 can include a cache 222 of high-speed memory connected directly with, in close proximity to, or integrated as part of the processor 220. The system 200 copies data from the memory 230 and/or the storage device 260 to the cache 222 for quick access by the processor 220. In this way, the cache provides a performance boost that avoids processor 220 delays while waiting for data. These and other modules can control or be configured to control the processor 220 to perform various operations or actions. Other system memory 230 can be available for use as well. The memory 230 can include multiple different types of memory with different performance characteristics. It can be appreciated that the disclosure may operate on a computing device 200 with more than one processor 220 or on a group or cluster of computing devices networked together to provide greater processing capability.

The processor 220 can include any general purpose processor and a hardware module or software module, such as module 1 262, module 2 264, and module 3 266 stored in storage device 260, configured to control the processor 220 as well as a special-purpose processor where software instructions are incorporated into the processor. The processor 220 can be a self-contained computing system, containing multiple cores or processors, a bus, memory controller, cache and the like. A mufti-core processor can be symmetric or asymmetric. The processor 220 can include multiple processors, such as a system having multiple, physically separate processors in different sockets, or a system having multiple processor cores on a single physical chip. Similarly, the processor 220 can include multiple distributed processors located in multiple separate computing devices, but working together such as via a communications network. Multiple processors or processor cores can share resources such as memory 230 or the cache 222, or can operate using independent resources. The processor 220 can include one or more of a state machine, an application specific integrated circuit (ASIC), or a programmable gate array (PGA) including a field PGA.

The system bus 210 can be any of several types of bus structures including a memory bus or memory controller, a peripheral bus, and a local bus using any of a variety of bus architectures. A basic input/output (BIOS) stored in ROM 240 or the like, may provide the basic routine that helps to transfer information between elements within the computing device 200, such as during start-up. The computing device 200 can further include storage devices 160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 260 can include software modules 262, 264, 266 for controlling the processor 220. The system 200 can include other hardware or software modules. The storage device 260 can be connected to the system bus 210 by a drive interface.

The drives and the associated computer-readable storage devices can provide nonvolatile storage of computer-readable instructions, data structures, program modules and other data for the computing device 200. In one aspect, a hardware module that performs a particular function can include the software component stored in a tangible computer-readable storage device in connection with the necessary hardware components, such as the processor 220, bus 210, display 270 and the like to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 200 is a small, handheld computing device, a desktop computer, or a computer server. When the processor 220 executes instructions to perform "operations", the processor 220 can perform the operations directly and/or facilitate, direct, or cooperate with another device or component to perform the operations.

Although the exemplary embodiment(s) described herein employs the hard disk 260, other types of computer-readable storage devices which can store data that are accessible by a computer, such as magnetic cassettes, flash memory cards, digital versatile disks (DVDs), cartridges, random access memories (RAMs) 250, read only memory (ROM) 240, a cable containing a bit stream and the like may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 200, an input device 290 represents any number of input mechanisms, such as a microphone for speech, a touch-sensitive screen for gesture or graphical input, keyboard, mouse, motion input, speech and so forth. An output device 270 can also be one or more of a number of output mechanisms known to those of skill in the art. In some instances, multimodal systems enable a user to provide multiple types of input to communicate with the computing device 200. The communications interface 280 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 220. The functions these blocks represent can be provided through the use of either shared or dedicated hardware, including, but not limited to, hardware capable of executing software and hardware, such as a processor 220, that is purpose-built to operate as an equivalent to software executing on a general purpose processor. For example the functions of one or more processors presented in FIG. 8 can be provided by a single shared processor or multiple processors. (Use of the term "processor" should not be construed to refer exclusively to hardware capable of executing software.) Illustrative embodiments can include microprocessor and/or digital signal processor (DSP) hardware, read-only memory (ROM) 240 for storing software performing the operations described below, and random access memory (RAM) 250 for storing results. Very large scale integration (VLSI) hardware embodiments, as well as custom VLSI circuitry in combination with a general purpose DSP circuit, can also be provided.

The logical operations of the various embodiments can be implemented as: (1) a sequence of computer implemented steps, operations, or procedures running on a programmable circuit within a general use computer; (2) a sequence of computer implemented steps, operations, or procedures running on a specific-use programmable circuit; and/or (3) interconnected machine modules or program engines within the programmable circuits. The system 200 shown in FIG. 8 can practice all or part of the recited methods, can be a part of the recited systems, and/or can operate according to instructions in the recited tangible computer-readable storage devices. Such logical operations can be implemented as modules configured to control the processor 220 to perform particular functions according to the programming of the module. For example, FIG. 8 illustrates three modules MOD 1 262, MOD 2 264 and MOD 3 266 that are modules configured to control the processor 220. These modules may be stored on the storage device 260 and loaded into RAM 250 or memory 230 at runtime or may be stored in other computer-readable memory locations.

One or more parts of the example computing device 200, up to and including the entire computing device 200, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type can implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 220 can include all types of processors disclosed herein, including a virtual processor. However, when referring to a virtual processor, the processor 220 can include the software components associated with executing the virtual processor in a virtualization layer and underlying hardware necessary to execute the virtualization layer. The system 200 can include a physical or virtual processor 220 that receives instructions stored in a computer-readable storage device, which cause the processor 220 to perform certain operations. When referring to a virtual processor 220, the system also includes the underlying physical hardware executing the virtual processor 220.

Figure 9:
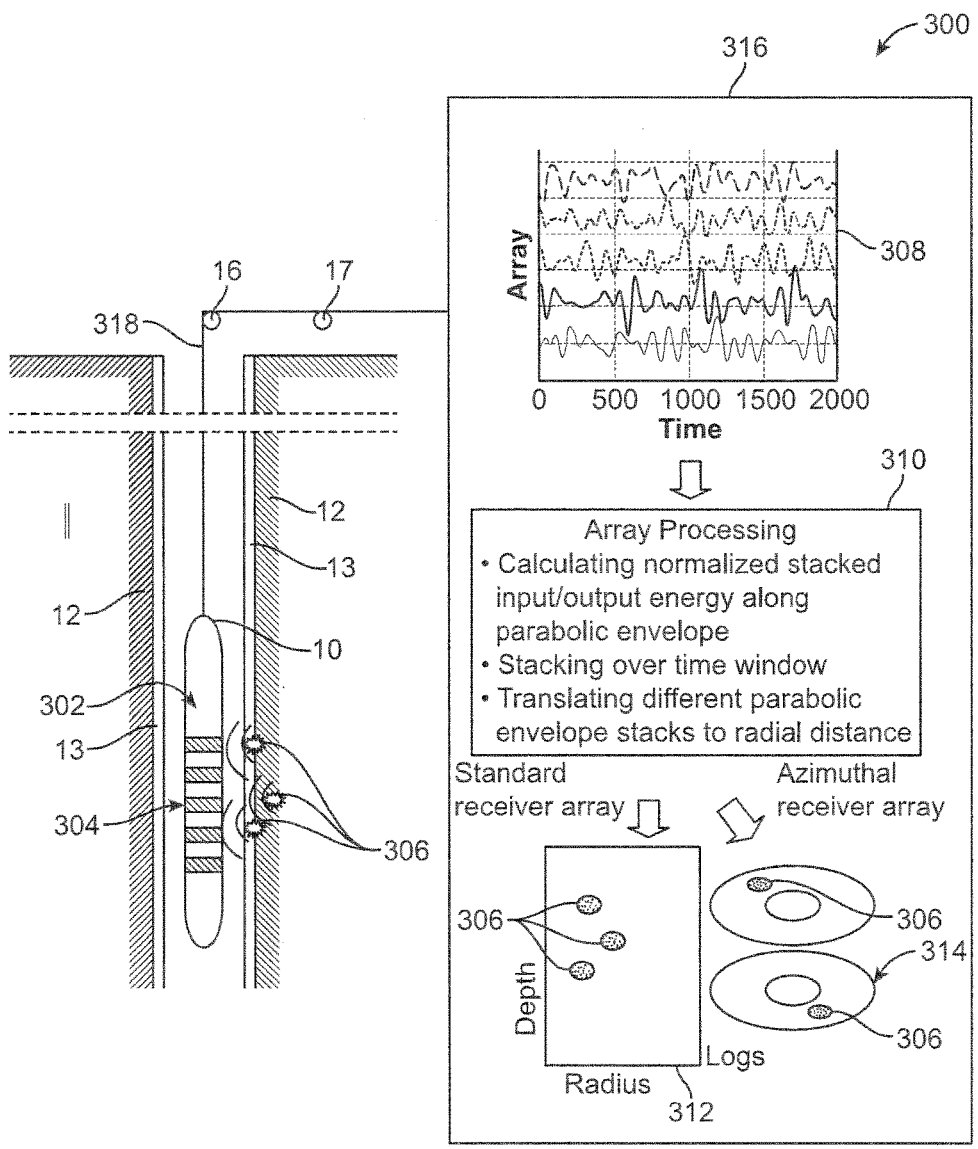
FIG. 9 is a schematic diagram of an example system embodiment, according to the present disclosure.

Having disclosed data processing methods for determining locations of acoustic sources around a borehole, and a computing system for executing instructions to perform the data processing methods, the disclosure now turns to FIG. 9, which illustrates a general system 300 according to the principles disclosed herein. First, acoustic sensors 304 can be included as part of a sensor array 302 lowered down into a borehole on a cable 318. The cable 318 supports the sensor array 302 as well as provides a conduit for data to be transmitted from the sensor array 302 to the system 316. The borehole can have a casing 13 and a structure or region 12 which is outside of the borehole. The region can just be the earth around the borehole or may be some other structure that is man-made. As discussed above, fluid leaks can affect operation and effectiveness of the borehole as well as create safety and environmental hazards. The detection of such leaks enhances efficiency and safety of the well. Other issues can also arise that need to be detected. Any source of acoustic emission can be detected and located according to the principles disclosed herein.

The sensor array 302 can be driven by power from the system 316 via the cable 318 or via batteries within the tool of the sensor array. A generator or other power source can also apply to provide the necessary power to run the acoustic sensors 304.

Each leak can be a source of acoustic emission which can be detected by the acoustic sensor array 304. Illustrated in FIG. 9 are several acoustic noise sources 306 either in the casing or in the earth 12. The cable 318 can support the tool sensor array 302 and provides data communication between the sensor array 302 and the system 316. The wheel 16 can enable the cable to be dropped down and raised within the borehole. A depth gauge 17 can be utilized to identify the depth at which the sensor array 302 is located and thus the depth at which the acoustic data signals are provided from the acoustic sensors 304. In FIG. 9, system 316 is similar to the hardware represented in the surface equipment 15 with a data processor 18 shown in FIG. 1. System 316 illustrates the data processing that occurs within the surface equipment or could in or part of the tool carrying the sensor array 302. Graph 308 represents the typical waveforms along the acoustic array from the acoustic source 306 behind the borehole. The data can be logged over time from each acoustic sensor 304 within the array 302. Each line of data in the graph 308 can represent received acoustic signatures for a period of time while the tool 302 is stationary or the tool 302 is moving up, down or in any other direction.

It is noted that in one embodiment, the acoustic sensors 304 may be placed within the tool approximately one-half foot apart. However, a variety of structures and positions of each acoustic sensor can be utilized in the tool 302. For example, in one embodiment several acoustic sensors can be used. When a large number of acoustic sensors are used, the tool 302 can achieve a higher degree of precision in locating an acoustical source. However, it is not a requirement that the number be large or that each acoustic sensor be used to take particular measurements. Where finer granularity is desired with respect to knowledge and confidence of the position of an acoustic signal, a higher frequency of acoustic source may need to be detected. This higher frequency can be for acoustic sources that are relatively close to the borehole. In such a case, each acoustic sensor can receive and process higher frequency signals. Other signals of lower frequency can be filtered. However, acoustic sources that are farther away from the borehole can be detected using relatively lower frequencies. In that scenario, the system 316 can be programmed to only receive data from a lesser number of acoustic sensors as necessary and at a lower frequency. Parameters such as the nature of the acoustic source (type of leak, acoustic environment around the leak, width of the casing and the like), the depth of the tool, the initial predicted location of the source of the acoustic signal and the like can cause the system to adjust other parameters such as which acoustic array to use for receiving the data, how to process the data to appropriately identify the radial distance and location of the source, and what frequencies to detect and/or filter in order to gather the data.

In one specific example, the tool 302 can include fifteen acoustic sensors each spaced three inches apart. As the tool 302 is raised via the wheel 16 by control of the system 316 and by the cable 318, an acoustic source 306 can be identified which is relatively far away from the borehole. Because the acoustic source 306 is further from the borehole than a threshold value, the system 316 can determine that from an efficiency standpoint only five acoustic sensors (i.e., every third acoustic sensor along the array) are necessary in order to adequately identify the radial distance of the acoustic source 306. Depending on whether the acoustic sources of interest are relatively close or relatively far from the borehole, less than fifteen of the acoustic sensors can be selected for locating the acoustic sources of interest, and the acoustic sensors can be selected so that the spacing between the selected acoustic sensors is either a consistent distance between each acoustic sensor (such as three inches or six inches) or a graduated distance between the sensor, such as where the distance between a center acoustic sensor and the first neighboring acoustic sensor on either side is three inches whereas a next distance between the first neighboring acoustic sensor and a second acoustic sensor next to the first sensor is six inches or twelve inches. The overall length of the acoustic array 304 can be six feet in one example, or shorter or longer distances as needed.

The decision of which acoustic sensors in the array should be activated to provide acoustic data signals for processing can be based on any number of parameters, such as an estimated radial distance of the acoustic source, a depth of the tool 302, a width of the casing 13 of the borehole, and so forth. Some of the differences in the choice of parameters can be related to how far away from the borehole axis (along the central axis of the lowered tool 302) the acoustic source is. For example, the selected acoustic sensors are spaced at intervals of between five and seven inches for locating the acoustic source within a radius of one to three feet from the borehole. If the acoustic source 306 is four feet away from the axis, then the system may need to choose a longer sensor array and lower frequencies in order to pinpoint the position of the acoustic source 306. A different confidence level can be associated with the accuracy of the location of the acoustical source 306 depending on the radial distance from the borehole axis.

Further as shown in FIG. 9, feature 310 illustrates the array processing component which includes calculating a normalized stacked input/output energy along a parabolic envelope (features 505, 510A, 507, 512A in FIG. 5 for example) by stacking over a time window. For a given radius, the acoustic data signals are offset in time in accordance with the borehole model of acoustic delay, and the offset acoustic data signals are summed to produce a stacked signal, and the energy of the stacked signal is evaluated over the time window.

The stacked energies are translated to an indication of radial distance from the borehole and displacement along the borehole of acoustic sources outside of the borehole. In the example of FIG. 9, when using a standard sensor array such as the sensor array in a B-SAT tool, the translation includes a graph 312 of the stacked signal energies as a function of radius from the borehole and depth. Acoustic sources are indicated as regions 306 in this graph. If there is not an acoustic source, and it is just background acoustical data, then nothing will show as an acoustic source for that particular position. Since the B-SAT tool has a cylindrical sensor array, it is not capable of recognizing any azimuthal direction of acoustic source origination. Therefore the azimuthal positions of the acoustic sources are not determined. If an azimuthal sensor array is used in the tool 302, then azimuthal positions of the acoustic sources can be determined. In this case, feature 314 represents a graph including an indication of the azimuthal positions of acoustic sources 306. The azimuthal position is an angular measurement in the cylindrical/spherical coordinate system. Therefore the system can produce a graphical representation of source energy strengths of the acoustic sources, which can be projected along a radial distance and depth as well as azimuthal direction to pinpoint the location of the acoustic source 306 in 3D.

It is assumed in the disclosure that the acoustic source 306 is in a static position and not moving. However, the processing can be adjusted to take into account a moving acoustic source 306. In such a case, the firmware and/or software can be modified to take into account the possibility that the source 306 is moving. If so, the system can adjust and change the speed of the movement of the tool, take extra measurements at a higher sample rate, and/or modify which acoustic sensors 304 are used and when, and so forth. Other processing can also be adjusted such that the system at several different times can identify the location and changed location of the acoustic source 306, as well as provide data on other parameter such as a vector direction of movement of the acoustic source 306, a rate of change of speed or direction, and so forth.

Figure 10:
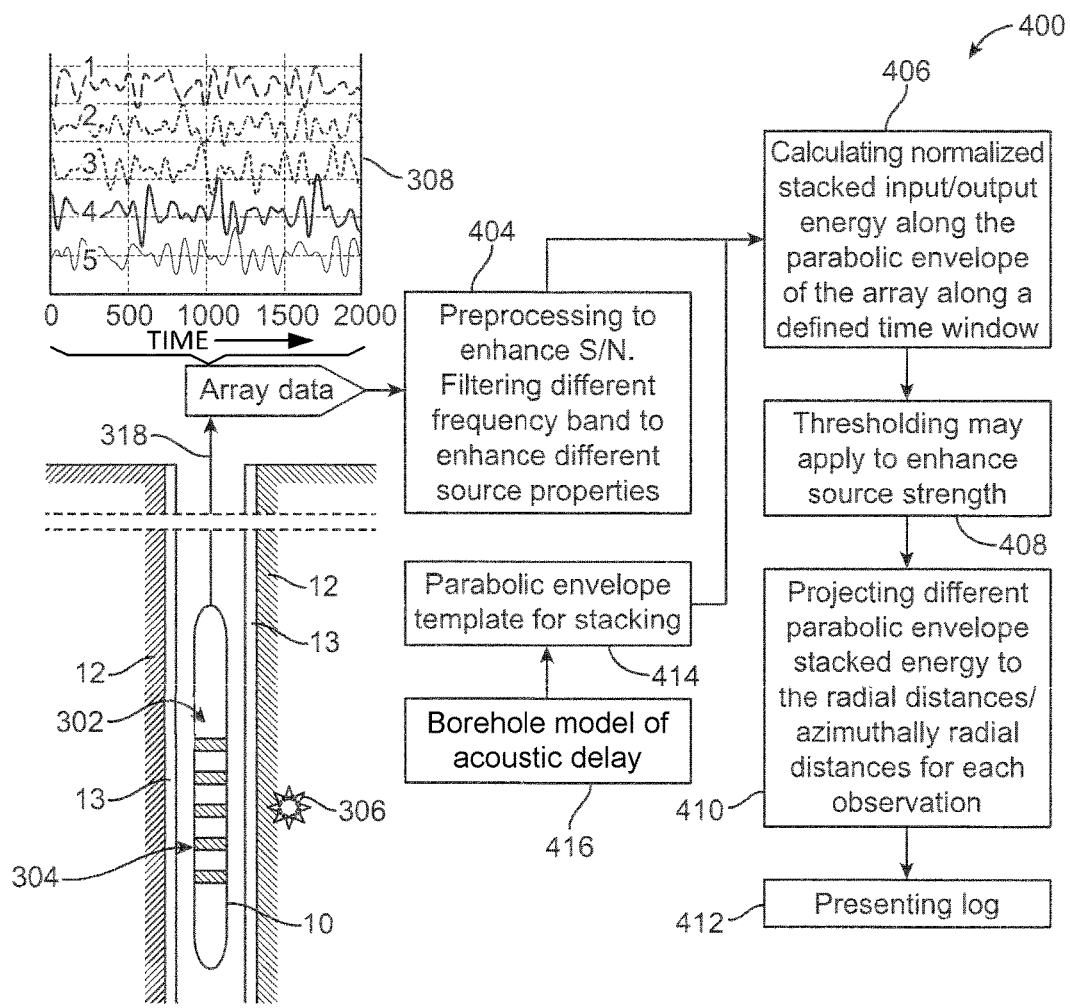
FIG. 10 is a flowchart of the example system embodiment of FIG. 9.

FIG. 10 illustrates further data processing operations that can be used in the system of FIG. 9. As shown in FIG. 10, the borehole is penetrating the earth 12 behind the casing 13, and the acoustic source 306, the sensor array 302 includes the acoustic sensors 304. Each of the acoustic sensors 304 that are turned on provides a respective acoustic data signal that is a function of time, and the collection of the acoustic data signals from the turned one acoustic sensors comprise array data 308. Each time that the data processing system receives such an array of data 308 from the acoustic sensors 304, this can be referred to as an observation. The array of data 308 can be preprocessed 404 to enhance the signal to noise ratio. One preprocessing approach can be to filter different frequency bands to enhance the different source properties. In one example, background acoustical data can cause the data to be less reliable and if a frequency of that background acoustical data can be identified, it can be filtered as part of a preprocessing of the data 308. If higher or lower frequencies from the acoustic source are desired, then filtering can provide just those frequencies that the system will process. As noted above, depending on a number of factors, a particular frequency range can be filtered based on some initial feedback data and dynamically adjusted or preprogrammed. Typically, the frequency range of the system will be below 40 or 50 kHz. In other cases, the frequency range can go up to 500 kHz or 1 MHz.

A parabolic envelope template 414 corresponding to a borehole model 416 of acoustic delay can be utilized in association with the stacking operation 406. The borehole model 416 can incorporate refraction, reflection and/or other wave propagation principles that can arise when the acoustic signal travels through different media such as fluid, the borehole casing 13, and so forth. In the stacking operation 406, the system calculates normalized stacked input/output energy along the parabolic envelope of the array along the defined time window. Then a thresholding operation 408 compares the stacked energies to a threshold to eliminate background noise and enhance the source signal strength. Then a projecting operation 410 includes projecting the different parabolic envelope stacked energies to both a radial distance using a tool such as B-SAT tool, the FWS tool (in which a depth and radius are used in a two dimensional graph to identify the location) and/or projecting an azimuthally radial distance using a tool with azimuthal sensors for each observation or depth. Projecting herein can mean the process of reproducing or associating the position or distance of the spatial object, for example a leak, based on the radial distance. This can be reproduced as a data set or graphically, for example in a graph or figure. Finally, a presentation operation 412 includes generation of logs including the stacked energies and their respective radial positions, depths, and azimuthal positions, and the respective radial positions, depths, and azimuthal positions of identified noise sources. This can be done via a log presentation or other text or graphical representations.

Figure 11:
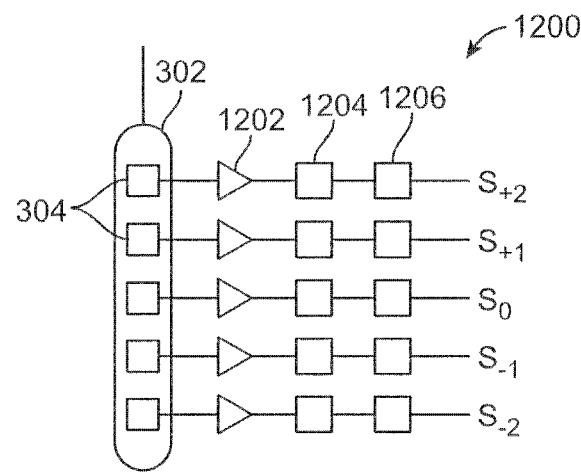
FIG. 11 is an example schematic diagram of obtaining acoustic data signals from respective acoustic sensors in the tool.

Having discussed some of the general principles above, the disclosure now provides more detail on the signal processing that may be used for detecting locations of acoustic sources. FIG. 11 shows pre-processing of acoustic signals from the acoustic sensors 304 in the tool 302. The acoustic signal from each acoustic sensor 304 is amplified 1202, bandpass filtered 1204, and digitized 1206 to provide a respective acoustic data signal ($S_i$) from each acoustic sensor 304. The acoustic signals are digitized by analog-to-digital converters that sample the acoustic signal at periodic intervals.

Figure 12:
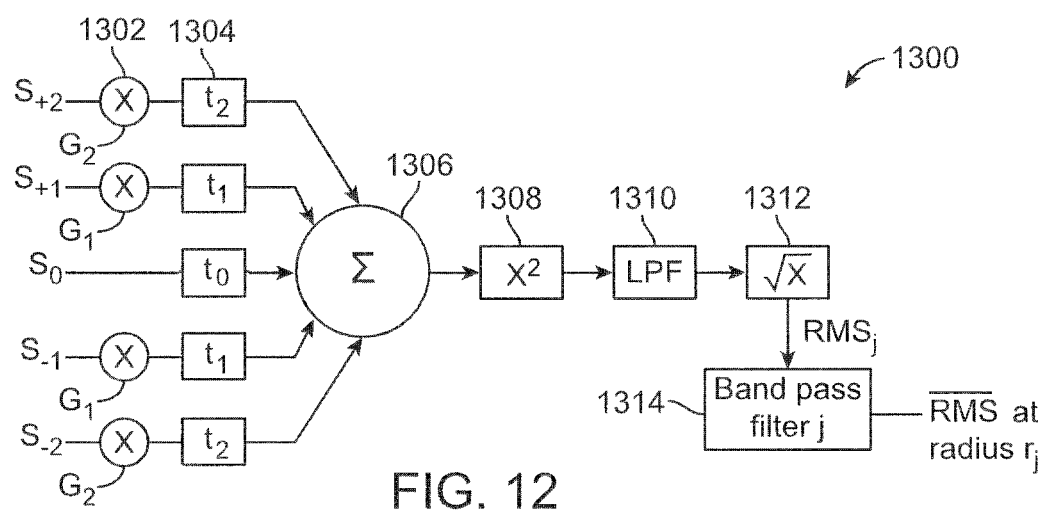
FIG. 12 is an example schematic diagram of applying the principles of FIG. 5 to the acoustic data signals from FIG. 11 for a given radius from the borehole.

FIG. 12 illustrates a processing pipeline 1300 for stacking of the acoustic data signals ($S_i$) for a given radius ($r_3$). Stacking is performed by applying respective gain factors 1302 and time delay offsets 1304 to combine the signals for the given radius. The borehole model is applied at this stacking stage to determine what the appropriate gain factor and time delays should be so that the signals are appropriately stacked. See FIG. 5 for a representation of how the signals from a single acoustic source can be aligned along a parabolic curve defined by the borehole model. The signals are combined so that the signals from the given radius add coherently, but noise and signals from different radii are substantially uncorrelated. Thus, by stacking, the signal to noise is improved for detecting the noise sources at the given radius. The signals are combined by applying a respective gain factor ($G_j$) and time delay offset ($t_j$) to each acoustic data signal ($S_j$), and then adding the offset acoustic data signals. The set of $G_j$'s 1302 and $t_j$'s 1304 are used as part of the application of the borehole model for the case of an acoustic noise source at the given radius.

At this stage of processing in FIG. 12, each of the acoustic data signals is a respective time series of data samples. A gain factor ($G_j$) is applied to an acoustic data signal ($S_j$) by multiplying each data sample of the acoustic data signal by the gain factor. The acoustic data signals ($S_j$) are offset by respective time delays ($t_j$) by storing the consecutive data samples of each acoustic data signal at consecutive memory addresses so that there is a linear correspondence between the memory address of a data sample and the sampling time of the data sample. Each respective time delay offset is converted to a corresponding memory offset by applying a constant conversion factor, and this memory offset is used for reading the data samples from memory. In effect, the data samples that are added together in the adder 1306 are data samples from the different acoustic data signals ($S_j$), and the data samples that are added together in the adder 1306 would have simultaneous origination times if the different acoustic data signals originated from an acoustic source at the radius ($r_j$) from the borehole at an offset along the borehole aligned with the middle of the acoustic sensor array.

For example, a gain factor for the acoustic data signal ($S_0$) from the middle sensor may be 1 since that sensor is at the shortest distance from the point ($N_0$) at the radius $r_0$ from the borehole and at an offset along the borehole aligned with the middle of the acoustic sensor array. The other weighting factors can be reduced by the ratio of $r_0$ to the distance from the point ($N_0$) to the acoustic sensor receiving the acoustic data signal ($S_j$). The time delay offset can be zero for the acoustic data signal ($S_j$) from the acoustic sensor furthest from the point ($N_0$), and the time delay offset for the acoustic data signal from the middle sensor can be the delay of the acoustic data signal ($S_j$) from the acoustic sensor furthest from the point ($N_0$) relative to the timing of the acoustic data signal from the middle sensor. For the parabolic borehole model, the gain parameters $G_1$ and $G_2$ can be $G_1=r_0/d_1$, $G_2=r_0/d_2$, and the time delay offsets can be $t_0=d_2/V_2$, $t_1=d_2/V_2-d_1/V_1$, $t_2=0$.

The offset acoustic data signals are then summed at 1306 to result in a stacked signal (x) for the given radius ($r_j$). This energy of the stacked signal (x) is detected by squaring the stacked signal in box 1308 and then evaluated over a time window by low pass filtering the squared signal in box 1310. The width of the time window is the width of the impulse response of the low pass filter, and this width can be a function of the given radius, for example smaller for a smaller radius, and larger for a larger radius. The system takes the square root 1312 of the output of the low pass filter to yield a root mean square signal (RMS) that indicates the presence of a noise source at the given radius ($r_j$) from the borehole. For the case where the sensor array is raised or lowered at a constant rate in the borehole, the $RMS_j$ signal is applied to a bandpass filter 1314 that functions as a spatial filter in the direction along the borehole and provides an indication of whether there is an acoustic source at the given radius and at various depths or offsets along the borehole. Thus, a peak in the signal from the bandpass filter 1314 indicates the presence of an acoustic source at a particular depth corresponding to the location of the middle acoustic sensor at the time of the peak.

Although FIG. 12 illustrates data processing for an odd number of regularly spaced sensors, the same processing could be applied to any variation of the sensor separations using appropriate gains ($G_j$'s) and time delay offsets ($t_j$'s) for the different sensor separations. In other words, the positioning and/or number of the sensors can be arbitrary or positioned relative to each other in a variety of ways.

Figure 13:
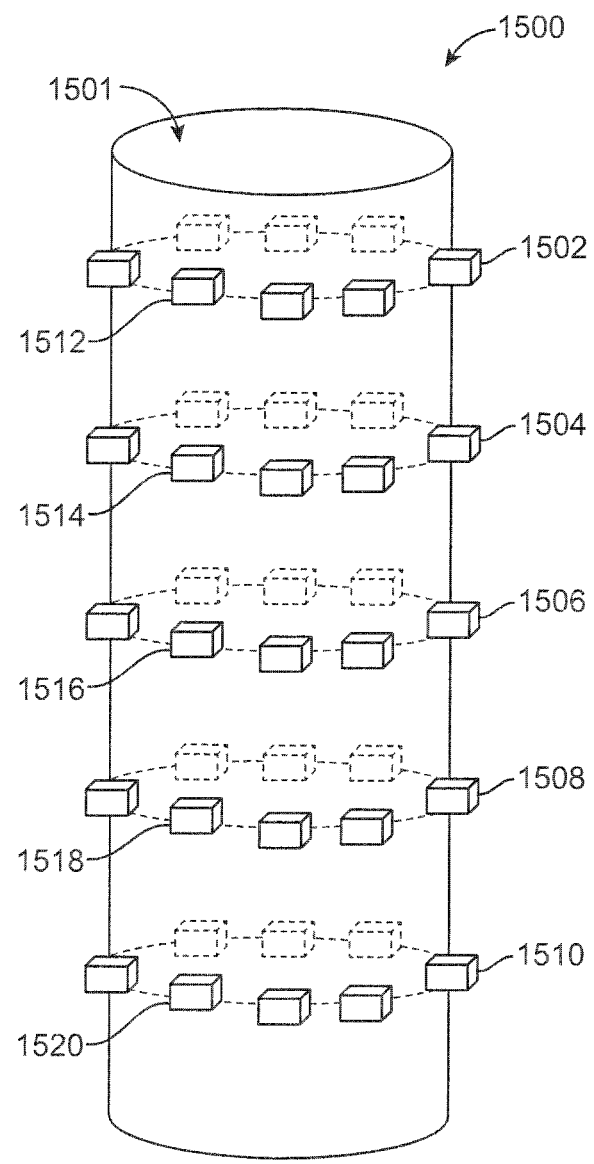
FIG. 13 is an example schematic diagram of an azimuthal acoustic sensor array.

FIG. 13 illustrates a schematic diagram of an azimuthal sensor tool 1500. The tool 1500 can include a number of groups of acoustic sensors 1501 at different azimuthal positions around the tool. For example, a first group of sensors includes sensors 1502, 1504, 1506, 1508 and 1510. As can be seen, the first group is positioned on an outer surface of the tool 10. Other groups are provided as well. As an example, a second group includes sensors 1512, 1514, 1516, 1518 and 1520. Other sets are shown as well. The positioning of the various sensors on the outer surface of the tool 1500 can be organized and having an equal spacing or there can be any variety of different spacings vertically and/or horizontally between respective neighboring sensors. The spacing vertically and/or horizontally can be arbitrary.

Figure 14:
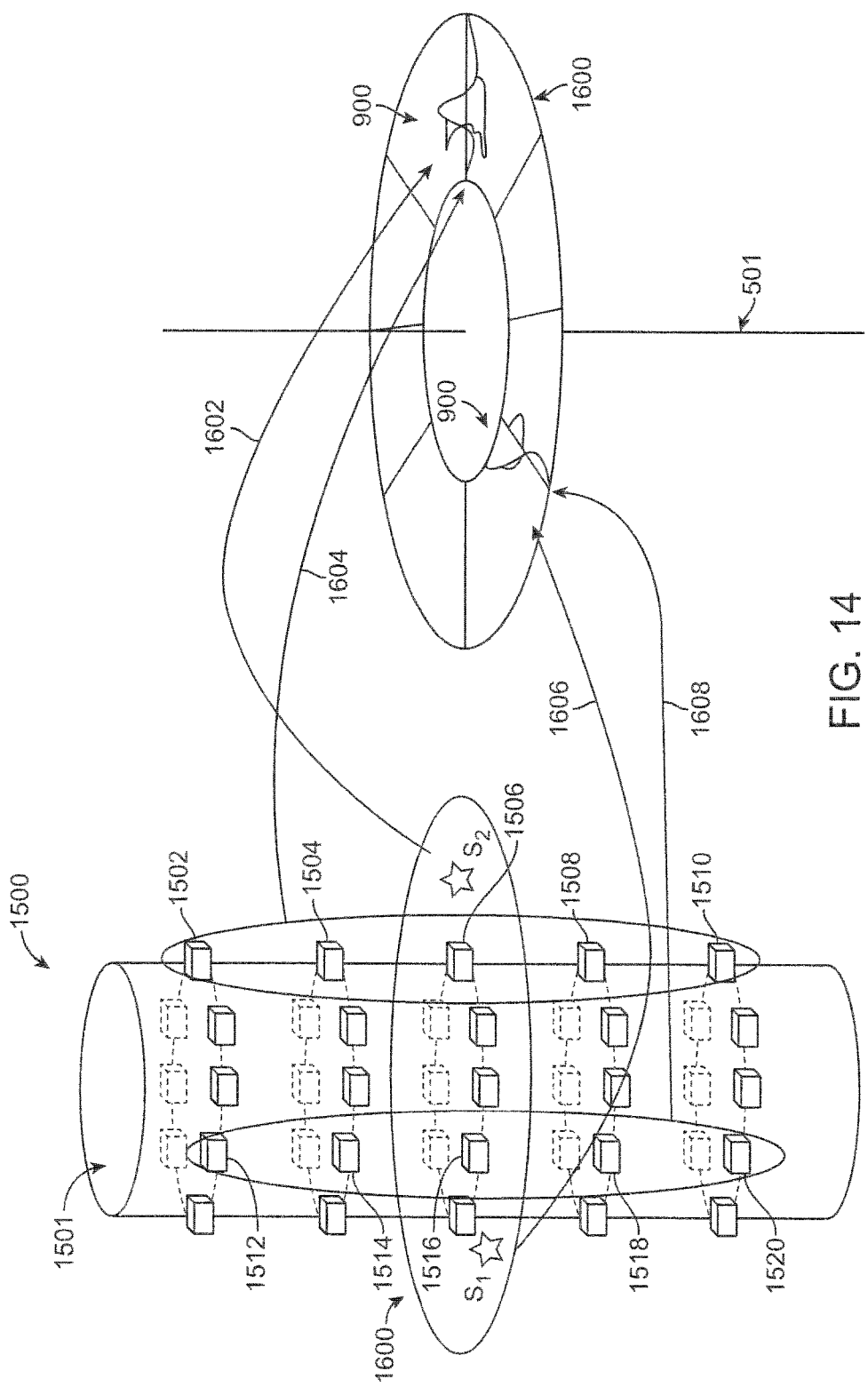
FIG. 14 is an example schematic diagram of the signal processing and azimuthal energy distribution for the azimuthal sensor of FIG. 13.

FIG. 14 illustrates the tool 1500 with a number of groups of sensors 1501 and illustrates the azimuthal energy distribution which can be identified and processed according to an embodiment. The first group of sensors (1502, 1504, 1506, 1508, 1510) are shown as near to an acoustic source ($S_2$). Each group of sensors is a vertical array that can be treated as described above to locate the acoustic source ($S_2$) at respective radii from an axis of the group of sensors and at a respective displacement along the tool. The stacked energy 1604 from the acoustic source ($S_2$) is projected 1602 at a corresponding azimuthal position 1600 of the sensor array. The representation of the stacked energy similar to that shown in FIG. 14 is represented as feature 900. The vertical axis of tool 1500 is shown also as feature 501. Information from different sets of sensors can also be processed, although they are farther away from a nearest set to an acoustic source, to help pinpoint a position of the acoustic source.

Similarly, acoustic source $S_1$ is relatively near the second set of sensors (1512, 1514, 1516, 1518, 1520) and processing the stacked energy 1608 to an azimuthal position 1606 results in data 900 representing the energy of the stacked signal at the corresponding azimuthal position of the acoustic source.

In one aspect, the data produced by the method and/or tool described above is one embodiment of this disclosure. The data provides information on the radius (or distance from an axis) of a source of noise in a borehole. The data can be stored on a computer readable storage device, and that data, developed by the process set forth above, can be considered one embodiment of this disclosure.

Embodiments within the scope of the present disclosure may also include tangible and/or non-transitory computer-readable storage devices for carrying or having computer-executable instructions or data structures stored thereon. Devices or a storage medium can be part of a system for controlling the raising, lowering, or other movement control of a tool 302 and the retrieval and processing of the acoustic array data received by the sensors on the tool 302. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

In one embodiment, a memory storage device could exist within a tool 302 or on surface equipment that is used to record some or all of the data obtained from one or more of the sensor array 304. The memory device can also store processed data and results of running an analysis on the data to determine a location of an acoustic source.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules can include routines, programs, components, data structures, objects, and the functions inherent in the design of special-purpose processors and so forth that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure can be practiced in network computing environments with many types of computer system configurations, including personal computers, hand-held devices, multi-processor systems, microprocessor-based or programmable consumer electronics, network PCs, minicomputers, mainframe computers, and the like. Embodiments can also be practiced in distributed computing environments where tasks are performed by local and remote processing devices that are linked (either by hard-wired links, wireless links, or by a combination thereof) through a communications network. In a distributed computing environment, program modules can be located in both local and remote memory storage devices.

Figure 15:
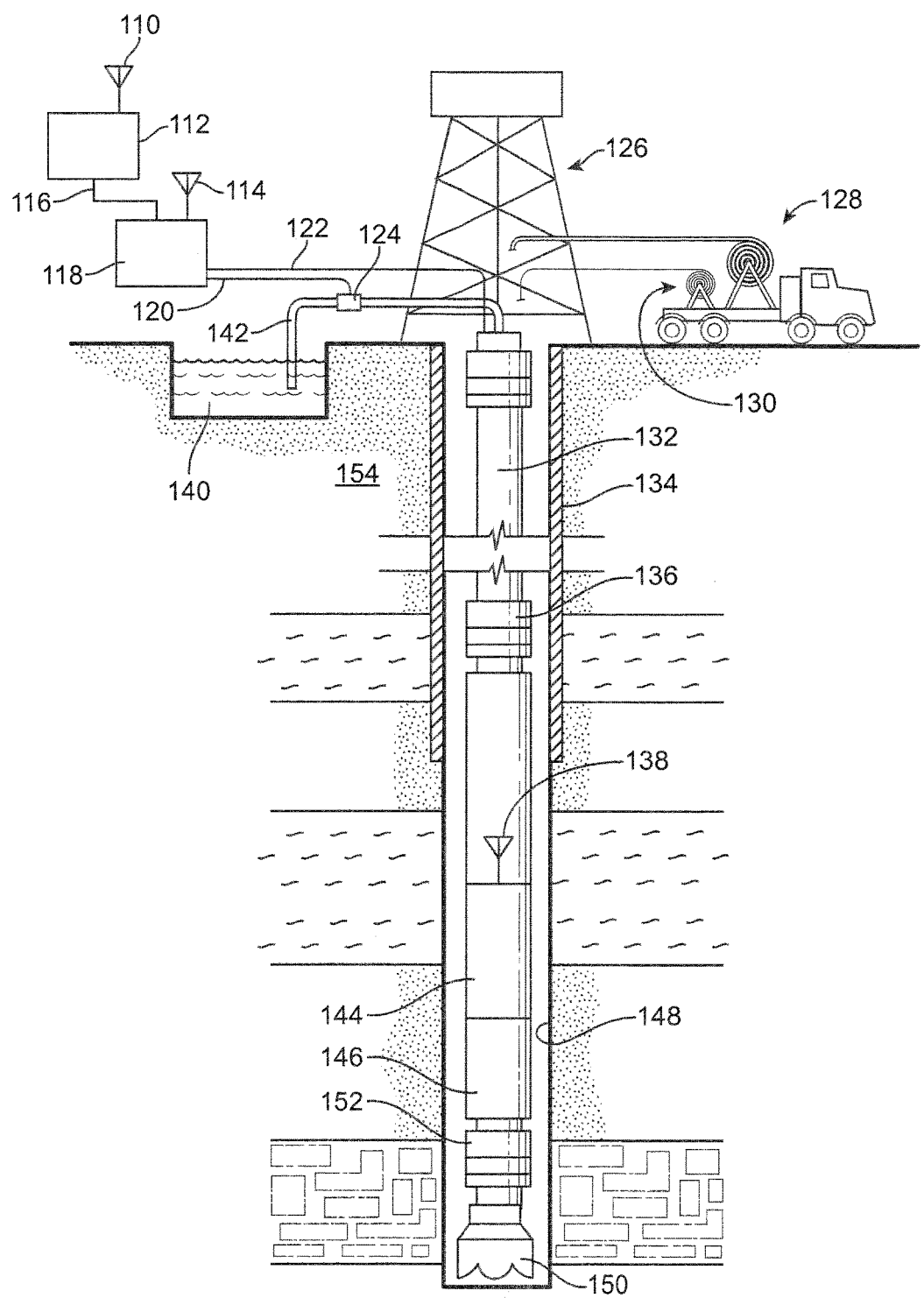
FIG. 15 is an example schematic diagram similar to FIG. 1, but illustrating additional environments, equipment and well characteristics applicable to aspects of the present disclosure.

FIG. 15 schematically illustrates alternative environments in which the acoustic detection device of the present disclosure can be implemented. Therein, a wellbore 148 is shown that has been drilled into the earth 154 using a drill bit 150. The drill bit 150 is located at the bottom, distal end of the drill string 132 and the bit 150 and drill string 132 are being advanced into the earth 154 by the drilling rig 126. The drilling rig 126 can be supported directly on land as shown or on an intermediate platform if at sea. For illustrative purposes, the top portion of the well bore 148 includes casing 134 that is typically at least partially comprised of cement and which defines and stabilizes the wellbore 148 after being drilled.

As shown in FIG. 15, the drill string 132 supports several components along its length. A sensor package 152, analogous to the tool 10 depicted in FIG. 1 is shown for detecting conditions near the drill string 132, conditions which can include such properties as formation fluid density, temperature and pressure, azimuthal orientation of the drill bit 150 or string 132, and acoustic conditions in and around the wellbore 148. In the case of directional drilling, measurement while drilling (MWD)/logging while drilling (LWD) procedures are supported both structurally and communicatively. Moreover, the sensor package 152 can detect characteristics of the formation and/or casing surrounding the wellbore 148 proximate the sensor package 152. A similar sensor package 136 is shown within the cased portion of the well which can be similarly enabled to sense nearby characteristics of the drill string, formation fluid, casing and surrounding formation. Regardless of which conditions or characteristics are sensed, data indicative of those conditions and characteristics is either recorded downhole, for instance at the processor 144 for later download, or communicated to the surface either by wire or wirelessly. If wirelessly, the downhole antenna 138 can be utilized to send data to a local processor 118, via topside antenna 114. There the data may be either processed or further transmitted along to a remote processor via wire 116 or wirelessly via antennae 114 and 110. The use of coiled tubing 128 and wireline 130 for downhole deployment is also schematically indicated and contemplated in the context of this disclosure. The possibility of an additional mode of communication is contemplated using drilling mud 140 that is pumped via conduit 142 to a downhole mud motor 146. Downhole, resistance to the incoming flow of mud is modulated to send backpressure pulses up to the surface for detection at sensor 124, and from which representative data is sent along communication channel 120 (wired or wirelessly) to one or more processors 118, 112 for recordation and/or processing.

The various embodiments described above are provided by way of illustration only and should not be construed to limit the scope of the disclosure. For example, the principles herein can apply to any detection of an acoustic source through a medium. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims. Claim language reciting "at least one of" a set indicates that one member of the set or multiple members of the set satisfy the claim.

The invention claimed is:

1. A method of determining a location of an acoustic source outside of a borehole, the method comprising:
   receiving acoustic data signals from respective acoustic sensors spaced along a tool lowered within the borehole;
   calculating, from the acoustic data signals, stacked energies for different radial distances from the borehole, wherein the stacked energy for each different radial distance from the borehole is computed by offsetting the acoustic data signals in time in accordance with a borehole model specifying acoustic delay to the respective acoustic sensor as a function of the radial distance from the borehole and an offset in the displacement along the borehole to the respective acoustic sensor, and summing the offset acoustic data signals to produce a stacked signal, and evaluating energy of the stacked signal over a time window; and
   translating at least one of the stacked energies to an indication of a radial distance of the acoustic source from the borehole.

2. The method of claim 1, wherein the borehole model is based on acoustic properties of a formation surrounding a well casing of the borehole and acoustic properties of the well casing.

3. The method of claim 1, wherein the borehole model specifies an acoustic delay that is a parabolic function of the offset in the displacement along the borehole to the respective acoustic sensor.

4. The method of claim 1, wherein the acoustic sensors are spaced at intervals of between five and seven inches.

5. The method of claim 1, wherein the translating at least one of the stacked energies to an indication of a radial distance for the acoustic source includes displaying a graph of the stacked energies as a function of the radial distance from the borehole.

6. The method of claim 1, wherein the translating at least one of the stacked energies to a radial distance for the acoustic source includes comparing the stacked energies to a threshold and finding that said at least one of the stacked energies exceeds the threshold.

7. The method of claim 1, which further includes:
receiving acoustic data signals from the respective acoustic sensors when the tool is at different displacements along the borehole;
calculating, from the acoustic data signals received when the tool is at each of the different displacements along the borehole, stacked energies for different radial distances from the borehole and for said each of the different displacements along the borehole, wherein the stacked energy for each different radial distance from the borehole and for said each of the different displacements along the borehole is computed by offsetting the acoustic data signals in time in accordance with the borehole model, and summing the offset acoustic data signals received when the tool is at each of the different displacements along the borehole to produce a stacked signal for said each of the different displacements along the borehole, and evaluating energy of the stacked signal for said each of the different displacements along the borehole over a time window; and
translating at least one of the stacked energies to an indication of displacement of the acoustic source along the borehole.

8. The method of claim 1, wherein the acoustic sensors are also spaced around a circumference of the tool to provide groups of the acoustic sensors at different azimuthal positions around the tool and spaced along the tool, and the method further includes computing the stacked energies for the different azimuthal positions from the acoustic data signals from the respective groups of the acoustic sensors, and translating at least one of the stacked energies to an indication of an azimuthal position of the acoustic source around the borehole.

9. A system for determining a location of an acoustic source outside of a borehole, the system comprising:
a tool having acoustic sensors spaced along the tool;
a processor electronically coupled to the tool to receive acoustic data signals from respective ones of the acoustic sensors; and
a computer-readable storage device storing instructions that, when executed by the processor, cause the processor to perform operations comprising:
receiving the acoustic data signals from the respective ones of the acoustic sensors;
calculating, from the acoustic data signals, stacked energies for different radial distances from the borehole, wherein the stacked energy for each different radial distance from the borehole is computed by offsetting the acoustic data signals in time in accordance with a borehole model specifying acoustic delay to the respective acoustic sensor as a function of the radial distance from the borehole and an offset in the displacement along the borehole to the respective acoustic sensor, and summing the offset acoustic data signals to produce a stacked signal, and evaluating energy of the stacked signal over a time window; and
translating at least one of the stacked energies to an indication of a radial distance of the acoustic source from the borehole.

10. The system as claimed in claim 9, wherein the borehole model is based on acoustic properties of a formation surrounding a well casing of the borehole and acoustic properties of the well casing.

11. The system as claimed in claim 9, wherein the acoustic sensors are spaced along the tool at intervals of between five and seven inches.

12. The system as claimed in claim 9, wherein the translating at least one of the stacked energies to an indication of a radial distance for the acoustic source includes displaying a graph of the stacked energies as a function of the radial distance from the borehole.

13. The system as claimed in claim 9, wherein the operations further include:
receiving the acoustic data signals from the respective acoustic sensors when the tool is at different displacements along the borehole;
calculating, from the acoustic data signals received when the tool is at each of the different displacements along the borehole, stacked energies for different radial distances from the borehole and for said each of the different displacements along the borehole, wherein the stacked energy for each different radial distance from the borehole and for said each of the different displacements along the borehole is computed by offsetting the acoustic data signals in time in accordance with the borehole model, and
summing the offset acoustic data signals received when the tool is at each of the different displacements along the borehole to produce a stacked signal for said each of the different displacements along the borehole, and evaluating energy of the stacked signal for said each of the different displacements along the borehole over a time window; and
translating at least one of the stacked energies to an indication of a displacement of the acoustic source along the borehole.

14. The system as claimed in claim 9, wherein the acoustic sensors are also spaced around a circumference of the tool to provide groups of the acoustic sensors spaced along the tool at different azimuthal positions around the tool, and the operations further include computing the stacked energies for the different azimuthal positions from the acoustic data signals from the respective groups of the acoustic sensors, and translating at least one of the stacked energies to an indication of an azimuthal position of the acoustic source around the borehole.

15. A computer-readable storage device storing instructions which, when executed by a computing device, cause the computing device to determine a location of an acoustic source outside of a borehole by perform operations comprising:
receiving acoustic data signals from respective acoustic sensors spaced along a tool lowered within a borehole;
calculating, from the acoustic data signals, stacked energies for different radial distances from the borehole, wherein the stacked energy for each different radial distance from the borehole is computed by offsetting the acoustic data signals in time in accordance with a borehole model specifying acoustic delay to the respective acoustic sensor as a function of the radial distance from the borehole and an offset in the displacement along the borehole to the respective acoustic sensor, and summing the offset acoustic data signals to produce a stacked signal, and evaluating energy of the stacked signal over a time window; and translating at least one of the stacked energies to a radial distance of the acoustic source from the borehole.

16. The computer-readable storage device as claimed in claim 15, wherein the borehole model is based on acoustic properties of a formation surrounding a well casing of the borehole and acoustic properties of the well casing.

17. The computer-readable storage device as claimed in claim 15, wherein the translating at least one of the stacked energies to a radial distance for the acoustic source includes displaying a graph of the stacked energies as a function of the radial distance from the borehole.

18. The computer-readable storage device as claimed in claim 15, wherein the translating at least one of the stacked energies to a radial distance for the acoustic source includes comparing the stacked energies to a threshold and finding that said at least one of the stacked energies exceeds the threshold.

19. The computer-readable storage device as claimed in claim 15, wherein the operations further include: receiving the acoustic data signals from the respective acoustic sensors when the tool is at different displacements along the borehole; calculating, from the acoustic data signals received when the tool is at each of the different displacements along the borehole, stacked energies for different radial distances from the borehole and for said each of the different displacements along the borehole, wherein the stacked energy for each different radial distance from the borehole and for said each of the different displacements along the borehole is computed by offsetting the acoustic data signals in time in accordance with the borehole model, and summing the offset acoustic data signals received when the tool is at each of the different displacements along the borehole to produce a stacked signal for said each of the different displacements along the borehole, and evaluating energy of the stacked signal for said each of the different displacements along the borehole over a time window; and translating at least one of the stacked energies to an indication of displacement of the acoustic source along the borehole.

20. The computer-readable storage device as claimed in claim 15, wherein the acoustic sensors are also spaced around a circumference of the tool to provide groups of the acoustic sensors at different azimuthal positions around the tool and spaced along the tool, and the operations further include computing the stacked energies for the different azimuthal positions from the acoustic data signals from the respective groups of the acoustic sensors, and translating at least one of the stacked energies to an indication of an azimuthal position of the acoustic source around the borehole.

* * * * *